United States Patent
Kondo et al.

(10) Patent No.: US 7,554,087 B2
(45) Date of Patent: Jun. 30, 2009

(54) SCINTILLATOR PLATE, MANUFACTURING METHOD OF THE SAME AND RADIATION IMAGE SENSOR

(75) Inventors: Masashi Kondo, Hachioji (JP); Yasushi Nagata, Kodaira (JP); Mitsuru Sekiguchi, Tokyo (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 0 days.

(21) Appl. No.: 11/846,312

(22) Filed: Aug. 28, 2007

(65) Prior Publication Data

US 2008/0054181 A1    Mar. 6, 2008

(30) Foreign Application Priority Data

Aug. 30, 2006    (JP) .............................. 2006-233347

(51) Int. Cl.
G01T 1/20    (2006.01)
G01T 1/00    (2006.01)

(52) U.S. Cl. .............................. 250/361 R; 250/483.1; 250/370.11

(58) Field of Classification Search ............. 250/361 R, 250/484.4, 368, 370.11, 483.1
See application file for complete search history.

(56) References Cited

U.S. PATENT DOCUMENTS

| | | | | |
|---|---|---|---|---|
| 5,386,122 A | * | 1/1995 | Yoshida et al. | 250/368 |
| 7,180,068 B1 | * | 2/2007 | Brecher et al. | 250/361 R |
| 2005/0061993 A1 | * | 3/2005 | Shibuya et al. | 250/484.4 |
| 2006/0263521 A1 | * | 11/2006 | Sato et al. | 427/248.1 |

* cited by examiner

*Primary Examiner*—David P Porta
*Assistant Examiner*—Faye Boosalis
(74) *Attorney, Agent, or Firm*—Finnegan, Henderson, Farabow, Garrett & Dunner, L.L.P.

(57) ABSTRACT

A scintillator plate comprising: (i) a radiation transmissive substrate; (ii) a light absorbing layer formed on the substrate, the light absorbing layer absorbing light of a prescribed wavelength range; and (iii) a scintillator layer formed on the light absorbing layer, the scintillator layer converting radiation to the light having a wavelength absorbable to the light absorbing layer.

11 Claims, 2 Drawing Sheets

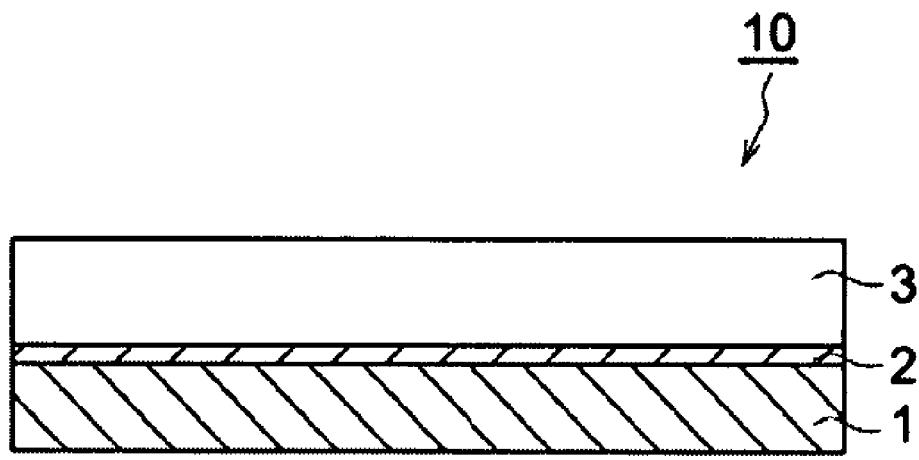
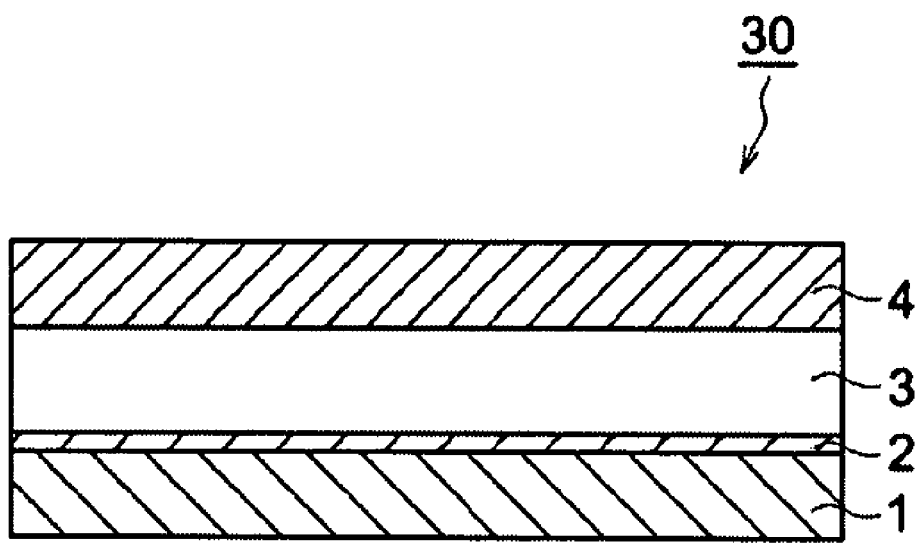

SCINTILLATOR PLATE, MANUFACTURING METHOD OF THE SAME AND RADIATION IMAGE SENSOR

This application is based on Japanese Patent Application No. 2006-233347 filed on Aug. 30, 2006 in Japanese Patent Office, the entire content of which is hereby incorporated by reference.

FIELD OF THE INVENTION

The present invention relates to a scintillator plate used for forming a radiation image of a subject, a method to manufacture the same and a radiation image sensor employing the same.

BACKGROUND

The radiographic image such as an X-ray image has been used over an extensive range in the field of medical treatment for the diagnosis of the state or progress of a disease. Specifically, the radiographic image based on an intensifying screen-film combination has been improved to enhance sensitivity and image quality in its long history. As a result, it is still employed in the field of medical treatment all over the world as an image pickup system characterized by both a high degree of reliability and excellent cost/performance ratio.

However, such image information pertains to so-called analog image information, which is not suited for free image processing or instantaneous transmission, unlike the digital image information that has been making a rapid progress in recent years.

In recent years, a radiographic image detecting apparatus of digital system represented by the Computed Radiography (CR) or flat panel detector (FPD) is coming on the market. The apparatus of this type directly provides a digital radiographic image, and directly shows an image on an image display apparatus such as a cathode ray tube or liquid crystal panel. It does not always require formation of an image on a photographic film. Thus, the X-ray image detecting apparatus of the digital system reduces the need of forming an image by silver halide photography, and hence provides a substantial improvement in the convenience of diagnostic operation in a hospital or clinic.

The Computed Radiography (CR) as one of the X-ray image digital techniques is currently being accepted in the field of medical treatment. However, it is insufficient in sharpness of the image and spatial resolution, and has not yet reached the image quality level of the screen/film system. A flat panel X-ray detector (FPD) using a thin film transistor (TFT) has been developed as a newer digital X-ray image technique, as disclosed, for example, in an "Amorphous Semiconductor Usher in Digital X-ray Imaging" by John Rowlands, "Physics Today", November 1997, P. 24, or "Development of a High Resolution Active Matrix, Flat-Panel Imager with Enhanced Fill Factor" by L. E. Antonuque, SPIE, P. 2. Vol. 32.

A flat panel X-ray detector (FPD) has characteristics that the size of the apparatus is smaller than that of the CR and that the quality of the image obtained at a higher dose of X-ray is excellent, however, on the other hand, the SN ratio is lowered at a low dose of X-ray due to the electric noise generated by TFT or by the circuit itself, whereby the image quality is not fully enough.

A scintillator plate containing an X-ray phosphor which emits light when irradiated with X-rays is used to convert radiation into visible light. To improve the SN ratio in low-dose photographing, it is necessary to use a scintillator plate of high light emitting efficiency. Generally, the emitting efficiency of a scintillator plate is determined by the thickness of a phosphor layer and the X-ray absorbency coefficient of the phosphor. However, increase in the thickness of the phosphor layer results in scattering of the light emitted in the phosphor layer, whereby the sharpness of the image is reduced. Accordingly, the film thickness is determined when the sharpness required for image quality is determined.

Cesium iodide (CsI) is characterized by a relatively high conversion ratio of X-rays to the visible light, and is capable of easily forming a phosphor in a columnar crystal structure by evaporation. Thus, the scattering of the light emitted in the columnar crystal is reduced due to the light guiding effect, and the thickness of the phosphor layer can be increased (refer to Patent Document 1).

In a columnar crystal of the scintillator, emitted light by the scintillator repeats many times of reflection and absorption before the emitted light reach the light ejecting surface of the scintillator crystal. Half of the emitted light proceeds toward the leading end of the crystal where the light is reflected and a part of the reflected light proceeds to the light emitting plane which is in the inside of the crystal, however, the reflected light having a larger vector in the lateral direction forms a crosstalk component of light which enters into neighboring scintillator crystals or crystals existing faraway, whereby the image resolution has been lowered.

Patent Document 1: Japanese Patent Application Publication Open to Public Inspection (hereafter referred to as JP-A) No. 63-215987

SUMMARY OF THE INVENTION

An object of the present invention is to provide a high resolution scintillator plate, a manufacturing method of the same and a radiation image sensor.

One of the aspects of the present invention to achieve the above object is a scintillator plate comprising: (i) a radiation transmissive substrate; (ii) a light absorbing layer formed on the substrate, the light absorbing layer absorbing light of a prescribed wavelength range; and (iii) a scintillator layer formed on the light absorbing layer, the scintillator layer converting radiation to light having a wavelength absorbable to the light absorbing layer.

BRIEF DESCRIPTION OF THE DRAWINGS

FIG. 1 is a schematic cross-sectional view of the scintillator plate.

FIG. 2 is a schematic cross-sectional view of the radiation image sensor.

DESCRIPTION OF THE PREFERRED EMBODIMENT

Figure 3:
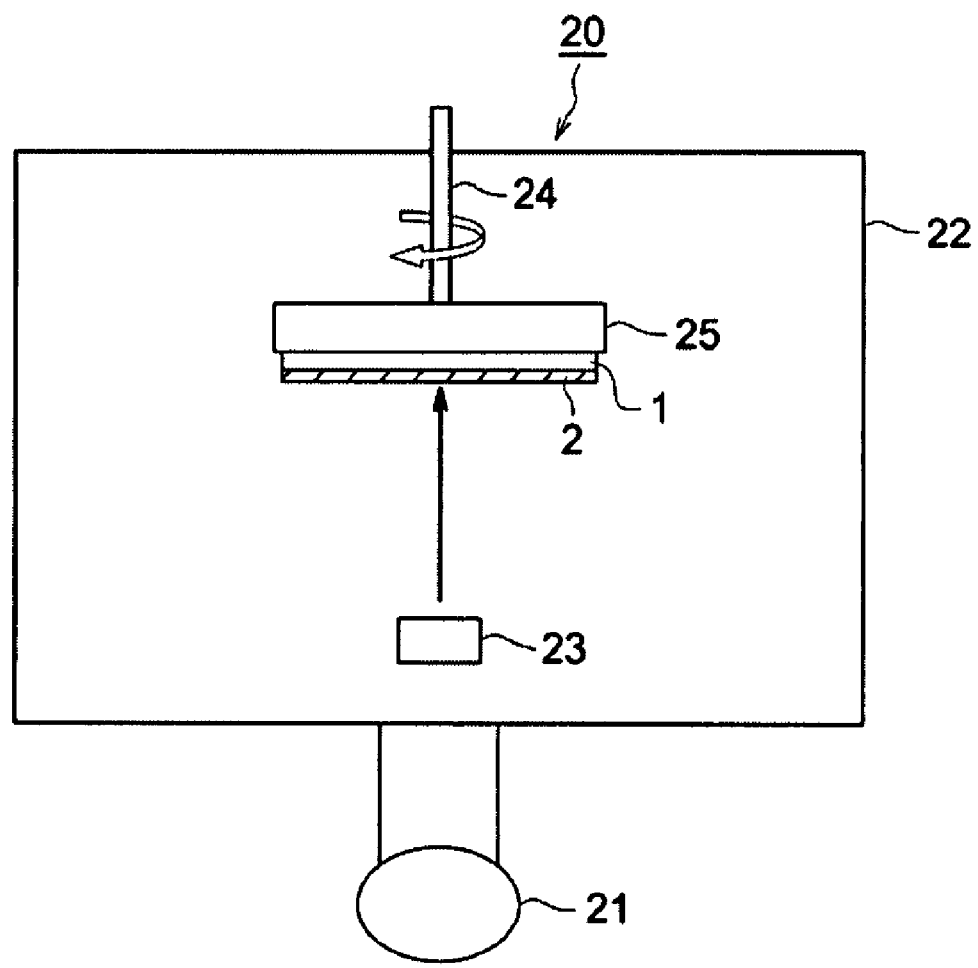
FIG. 3 is a schematic configuration diagram of a vacuum evaporation apparatus.

The above object of the present invention is achieved by the following structures:

(1) A scintillator plate comprising:
 (i) a radiation transmissive substrate;
 (ii) a light absorbing layer formed on the substrate, the light absorbing layer absorbing light of a prescribed wavelength range; and (iii) a scintillator layer formed on the light absorbing layer, the scintillator layer converting radiation to light having a wavelength absorbable to the light absorbing layer.

(2) The scintillator plate of Item (1), wherein a spectral reflectance of the light absorbing layer in a wavelength range of 500 to 600 nm is 5% or more and less than 50%.

(3) The scintillator plate of Item (1) or (2), wherein the scintillator layer comprises a phosphor comprising CsI.

(4) The scintillator plate of Item (3), wherein the phosphor comprises Thallium as an activator.

(5) The scintillator plate of Item (4), wherein a content of Thallium is 0.03 to 30 mol % based on total moles of the phosphor.

(6) The scintillator plate of any one of Items (1) to (5), wherein the substrate is an aluminum plate.

(7) The scintillator plate of any one of Items (1) to (5), wherein the substrate is a resin film comprising polyimide, polyethyleneterephthalate, polyethylenenaphthalate or polycarbonate.

(8) A radiation image sensor comprising a scintillator plate of any one of Items (1) to (7) and a photodetector which faces a scintillator layer of the scintillator plate.

(9) A method of manufacturing the scintillator plate of any one of Items (1) to (7) comprising the steps of:
 (i) forming a light absorbing layer on the radiation transmissive substrate; and
 (ii) forming a scintillator layer on the light absorbing layer.

(10) A method of manufacturing the scintillator plate of Item (6) comprising the steps of:
 (i) applying a surface-roughening treatment on a surface of the aluminum plate;
 (ii) forming a light absorbing layer on the surface of the aluminum plate being applied with the surface-roughening treatment; and
 (ii) forming a scintillator layer on the light absorbing layer.

(11) The method of Item (10), wherein the surface-roughening treatment is an alumite treatment.

According to the present invention, a scintillator plate exhibiting a notably improved sharpness is obtained.

The present invention will now be explained using FIGS. 1-3, however, the range of the present invention is not limited to illustrated figures.

FIG. 1 is a schematic cross-sectional view of the scintillator plate. Scintillator plate 10 has Substrate 1 which is radiation transmissive, having thereon Light absorption layer 2 which absorbs light of prescribed wavelength range, and further having thereon Scintillator layer 3.

When radiation enters into Scintillator plate 10 from the direction of Substrate 1 to Scintillator layer 3, the radiation enters into Scintillator layer 3 is absorbed by the phosphor contained in Scintillator layer 3 and electromagnetic rays (light) having wavelengths of 300-800 nm are emitted from Scintillator layer 3 in accordance with the intensity of the radiation.

A part of the emitted light reaches the light ejecting surface of the columnar crystal of the phosphor, however, another part of the emitted light proceeds to the substrate direction. In the present invention, the light proceed to the substrate direction is absorbed by the Light absorption Layer 2 which is a layer provided on the substrate and absorbs light of prescribed wavelength range, whereby scattered reflection at the substrate is avoided and lowering of sharpness of the image is avoided. Thus, the sharpness and the sensitivity can be balanced by controlling the reflectance within the prescribed range.

The expression "absorbing light of the prescribed wavelength range" as referred to in the present invention means to absorb the light emitted from the scintillator. In the present invention, the spectral reflectance of the light correspond to the first peak in the intensity profile of the light emitted from Scintillator layer 3 is preferably 5 to 50%. Namely, in the present invention, the spectral reflectance of the light within the wavelength range of 500-600 nm is preferably 5 to 50%.

The first peak in the intensity profile as referred to herein means the strongest light in the wavelength range of the light emitted from Scintillator layer 3.

The spectral reflectance at Light absorption layer 2 is measured by a commercially available instrument for measuring spectral reflectance, for example, Spectrophotometer U-3210 or U-4000 produced by Hitachi High-Technologies Corp.

A radiation image sensor can be fabricated by closely contacting a photodetector so as to face the Scintillator layer, using the scintillator prepared as above.

FIG. 2 is a schematic construction view of Radiation image sensor 30 in which Photodetector 4 is facing the surface of Scintillator layer 3 of Scintillator plate 10.

As a photodetector, well known solid state sensors, for example, photo diode, CCD and CMOS sensor are usable.

Materials to manufacture the scintillator plate and the manufacturing method of the scintillator plate will be described below.

<Substrate>

As a substrate, any substrate usually used for a scintillator plate is applicable, provided that it can support a light absorption layer and a scintillator layer and can transmit 10% or more of radiation such as X-rays based on the incident dose. Usually, a resin substrate, a glass substrate or a metal plate is used. Of these, preferable is an aluminum plate or a resin film such as a carbon fiber reinforced resin sheet, from the viewpoint of durability or weight saving.

<Light Absorption Layer>

The light absorption layer of the present invention will be described.

In the present invention, it is preferable to form Light absorption layer 2 which absorbs light of the prescribed wavelength range between the substrate and the scintillator layer which will be mentioned later.

The light absorption layer can be formed by various methods, for example, the following methods.

(1) Dying the surface of the substrate or dying after the substrate is subjected to a surface roughing (for example, alumite processing the surface an aluminum plate) to form a light absorption layer. Examples of a dye include: an azo dye, anthraquinone dye, an indigoid dye, a phthalocyanine dye, a sulfur-containing dye, a triphenylmethane dye, a pyrazolone dye, a stilbene dye, a diphenylmethane dye, a xanthene dye, an alizarin dye, an acridine dye, an azine dye, an oxazin dye, a thiazine dye, a thiazole dye, a methine dye, a nitro dye, a nitroso dye and a commercially available dye for alumite.

(2) Dispersing a resin and a pigment in an organic solvent and coating the substrate with the dispersion, followed by drying, to form a light absorption layer. Examples of a resin include: polyvinyl alcohol, polyvinyl butyral, polyvinyl formal, polycarbonate, polyester resin, polyethylene terephthalate, polyethylene, nylon, (meth)acrylic acid or (meth)acrylate ester, vinyl esters, vinyl ketones, styrenes, and diolefins, (meth) acrylamides, vinyl chlorides, vinylidene chlorides, cellulose derivatives (such as nitro cellulose, acetyl cellulose and diacetyl cellulose), silicon resin, polyurethane resin, polyamide resin, various synthetic rubber resins, phenol resin, epoxy resin, urea resin, melamine resin and phenoxy resin. Of these, hydrophobic resins such as polyester resin and polyurethane resin are preferable in view of adhesion property with the substrate and with the scintillator layer, and in view of corrosion-resistance of the substrate. Examples of a pigment include: carbon black, chromium oxide, nickel oxide and iron oxide. Examples of an organic colorant include: Zabon fast blue 3G (produced by Höchst), Estrol brill blue N-3RL (made by Sumitomo Chemical Co., Ltd.), D&C blue No. 1 (produced by National Aniline), Spirit blue (produced by Hodogaya Chemical Co., Ltd.), Oil blue No. 603 (produced by Orient Chemical Co., Ltd.), Kiton blue A (produced by Ciba-Geigy), Aizen cathilon blue GLH (produced by Hodogaya Chemical Co., Ltd.), Lake blue AFH (produced by Hodogaya Chemical Co., Ltd.), Primo cyanine 6GX (produced by Inahata & Co., Ltd.), Bril acid green 6BH (produced by Hodogaya Chemical Co., Ltd.), Cyan Blue BNRCS (produced by Toyo ink) and Lionoil blue SL (produced by Toyo ink). Also cited are organometallic complex colorants of Color Index Nos. 24411, 23160, 74180, 74200, 22800, 23154, 23155, 24401, 14830, 15050, 15760, 15707, 17941, 74220, 13425, 13361, 13420, 11836, 74140, 74380, 74350, and 74460. As an inorganic colorant, such as permanent blue, cobalt blue, cerulean blue, chromium oxide, and $TiO_2$—ZnO—Co—NiO are cited.

(3) A resin substrate is, for example, prepared as follows: a pigment is dispersed in a melted resin, the resin is co-extruded with a resin for substrate to form a film by rolling or stretching. Thus a substrate having thereon a pigment-dispersed layer is obtained. Examples of a resin film include: a cellulose acetate film, a polyester film, a polyethylene terephthalate film, a polyamide film, a polyimide film, a cellulose triacetate film and a polycarbonate film. Examples of a pigment include: carbon black, chromium oxide, nickel oxide and iron oxide. Examples of an organic colorant include: Zabon fast blue 3G (produced by Höchst), Estrol brill blue N-3RL (made by Sumitomo Chemical Co., Ltd.), D&C blue No. 1 (produced by National Aniline), Spirit blue (produced by Hodogaya Chemical Co., Ltd.), Oil blue No. 603 (produced by Orient Chemical Co., Ltd.), Kiton blue A (produced by Ciba-Geigy), Aizen cathilon blue GLH (produced by Hodogaya Chemical Co., Ltd.), Lake blue AFH (produced by Hodogaya Chemical Co., Ltd.), Primo cyanine 6GX (produced by Inahata & Co., Ltd.), Brill acid green 6BH (produced by Hodogaya Chemical Co., Ltd.), Cyan Blue BNRCS (produced by Toyo ink) and Lionoil blue SL (produced by Toyo ink). Also cited are organometallic complex colorants of Color Index Nos. 24411, 23160, 74180, 74200, 22800, 23154, 23155, 24401, 14830, 15050, 15760, 15707, 17941, 74220, 13425, 13361, 13420, 11836, 74140, 74380, 74350, and 74460. As an inorganic colorant, such as permanent blue, cobalt blue, cerulean blue, chromium oxide, and $TiO_2$—ZnO—Co—NiO are cited.

In the present invention, in order to control the spectral reflectance of the light absorption layer within the preferable range, various dyes and pigments each having a different spectral reflectance are appropriately selected and used in combination.

<Scintillator Layer>

The scintillator layer formed on the above-mentioned light absorption layer will now be described.

The scintillator layer is formed with a phosphor for X-ray radiography, and ordinary employed X-ray phosphors for scintillator are applicable.

Cesium iodide (CsI) is preferably utilized as a phosphor for X-ray radiography because the change ratio from X-rays to visible light is comparatively high and the phosphor can be easily formed into a columnar crystal structure by vacuum evaporation, with the result that the scattering of the emitted light in the crystal is reduced due to the light guiding effect and thus the thickness of the phosphor layer can be increased. However, when only CsI is used, the light emitting efficiency is not high enough. To increase the emission efficiency, various types of activators are added thereto. For example, CsI blended with sodium iodide (NaI) at a desired mole ratio is employed, as disclosed in the Examined Japanese Patent Publication No. 54-35060.

In recent years, a method of manufacturing the X-ray phosphor has been disclosed, for example, in the JP-A No. 2001-59899, wherein CsI is subjected to vapor deposition, and an activator such as indium (In), thallium (Tl), lithium (Li), calcium (K), rubidium (Rb) or sodium (Na) are formed by spattering.

Moreover, CsBr or CsCl is also applicable as a base material of the phosphor, or a mixture of two or more of CsI, CsBr and CsCl mixed in an optional ratio may also be used as a base material to form Scintillator layer 3. Scintillator layer 3 may be formed by any method known in the art, however, in the present invention, the scintillator layer is preferably formed via a vapor deposition method.

FIG. 3 is a schematic configuration diagram of a vacuum evaporation apparatus by which a phosphor layer is formed via a vapor deposition method on a substrate having thereon a light absorption layer.

In FIG. 3, 20 shows a vacuum evaporation apparatus. Vacuum evaporation apparatus 20 contains Vacuum container 22 in which contained are: Substrate holder 25 which holds Substrate 1 having thereon Light absorption layer 2, Evaporation source 23, Substrate rotation mechanism 24 which rotates Substrate holder 25 against Evaporation source 23 while depositing the vapor from Evaporation source 23. Also, Vacuum pump 21 which evacuates Vacuum container 22 or introduces air to Vacuum container 22 is contained.

Evaporation source 23 accommodates phosphor layer forming material and heats it with a resistance heating method. Evaporation source 23 may be constituted from an aluminum crucible being wound with a heater, or from a combustion boat or a heater prepared from a refractory metal. In addition to a resistance heating method, a heating method using an electron beam or using high frequency induction is also applicable, however, in the present invention, a resistance heating method is preferably employed to heat the phosphor layer forming material due to the following reasons: namely, handling is easy, it does not cost much, and it is applicable to many kinds of materials.

Substrate holder 25 is preferably equipped with a heater (not illustrated) to heat Substrate 1 having thereon Light absorption layer 2. By heating, the surface adsorbate of Light absorption layer 2 may be desorbed to remove, formation of an impurity layer between Light absorption layer 2 and the phosphor layer may be avoided, the adhesion between Light absorption layer 2 and the phosphor layer may be strengthened, and the quality of the phosphor layer may be controlled.

Further, a shutter (not illustrated) may be provided between Evaporation source 23 and Substrate 1 having thereon Light absorption layer 2, which intercepts the space between Evaporation source 23 and Light absorption layer 2. By providing the shutter, deposition of the substance other than the object substance existing on the surface of phosphor layer forming material and evaporates in the early step of vacuum evaporation on the Light absorption layer 2 can be avoided.

In the scintillator plate of the present invention, one of the most preferable embodiments is a substrate having thereon a light absorption layer, and further having thereon columnar crystals containing CsI as a main component as a scintillator layer, the crystals being formed via a vacuum evaporation method.

EXAMPLES

The present invention will be explained below with referring to the examples.

Example 1

[Manufacturing Method of Scintillator Plate]

As a surface roughening process, an alumite treatment was carried out on a surface of a 1 mm thick aluminum plate. The aluminum plate having thereon an alumite layer was immersed in a 10 g/L solution of "TAC-413" produced by Okuno Chemical industries, Co., Ltd., which is a black dye for alumite, at 55° C. to form a substrate having a black alumite layer as a light absorption layer. The blackness (black degree) was varied by changing the immersion period to prepare substrates each having a different reflectance.

[Measurement of Spectral Reflectance]

The spectral reflectance of the substrate having thereon a light absorption layer was measured using spectral photometer CM-2600d (produced by Konica Minolta Sensing Inc.), and the spectral reflectance at the wavelength of the 1st peak in the intensity profile of the phosphor CsI:Tl (0.03 mol % to 3 mol %) of a scintillator layer (550 nm) was determined.

The measurement results of each specimen are shown in Table 1.

A scintillator layer was formed on the light absorption layer of each substrate under the following condition.

<Gaseous Phase Deposition Method (Vacuum Evaporation)>

The scintillator layer was formed under the following condition according to the process described below: (i) Substrate 1 having thereon Light absorption layer 2 was fixed on Substrate holder 25 in Vacuum chamber 22; (ii) CsI:Tl (0.03 mol %-3 mol %) as a phosphor was put into a resistance heating boat to form Evaporation source 23; (iii) the inside of the vacuum chamber was evacuated with a vacuum pump; and (iv) the resistance heating boat was heated by providing current to form a scintillator layer.

Substrate temperature: 150-200° C.
Vacuum: $5.0 \times 10^{-3}$-$5.0 \times 10^{-2}$ Pa (Ar gas suppried)
Scintillator layer deposition rate: 1-10 μm/min The obtained scintillator layer was observed with an optical microscope to confirm that columnar crystals were formed with a layer thickness of 500 μm.

Then, each obtained scintillator plate was evaluated.

[Sharpness Measurement]

The resolution of each scintillator plate was estimated with the sharpness.

Each scintillator plate was adhered with a CCD mode photo-detector so that the scintillator layer of the scintillator plate faced the photo-detector. Thus, Radiation image sensor 30 as shown in FIG. 2 was obtained.

After adhering a CTF (Contrast Transfer Function) chart on the substrate surface of the scintillator plate opposite to the scintillator layer side, 10 mR of X-ray (tube voltage: 80 kVp, distance from X-ray tube to scintillator plate: 1.5 m) was irradiated. Image signal was obtained by detecting the light emission from the scintillator plate. The modulation transfer function (MTF) of the image was obtained from the image signal and used as an index to evaluate the sharpness of the image, wherein the MTF value was obtained at a space frequency of 2 cycle/nm.

In the present invention, the sharpness of each sample was expressed as a relative value when the sharpness of Sample No. 3 was set to 1.00.

The evaluation results of each sample are shown in Table 1.

TABLE 1

| Sample No. | Presence of light absorbing layer | Immersion period (minutes) | Spectral reflectance (550 nm) | Sharpness (Relative value) | Remarks |
| --- | --- | --- | --- | --- | --- |
| 1 | No | — | — | 0.84 | Comparative |
| 2 | Yes | 5 | 70 | 0.98 | Inventive |
| 3 | Yes | 30 | 55 | 1.00 | Inventive |
| 4 | Yes | 45 | 45 | 1.13 | Inventive |
| 5 | Yes | 90 | 20 | 1.18 | Inventive |
| 6 | Yes | 120 | 10 | 1.23 | Inventive |

The result of Table 1 shows that the samples of the present invention exhibit superior properties.

Example 2

Aluminum was sputtered on a polyimide film having a thickness of 125 μm (UPILEX-125S, produced by UBE INDUSTRIES, LTD.) to form a Aluminum layer of 0.01 μm.

<Preparation of Light Absorbing Layer>

| | |
| --- | --- |
| Byron 200 (Polyester resin, produced by TOYOBO CO., LTD.) | 100 mass parts |
| Carbon black | 4 mass parts |
| Methylethylketone | 100 mass parts |
| Toluene | 100 mass parts |

Above materials were mixed and dispersed for 15 hours using a beads-mill to obtain a coating liquid for a light absorbing layer. This coating liquid was applied with a dry thickness of 1.5 μm using a bar-coater, on the surface of the above polyimide substrate where aluminum was sputtered. In addition to the abovementioned coating liquid for the light absorbing layer, the coating liquids containing the following amounts of carbon black were prepared, namely, 0, 8, 12, 16, 20 mass parts. Each of these coating liquids were applied similarly on the substrate.

<Formation of Scintillator Layer>

In the same manner as described above for the scintillator plate using an aluminum substrate, a scintillator layer was formed on each substrate having each spectral reflectance.

[Evaluation]

In the same manner as described above for the scintillator plate using an aluminum substrate, the sharpness of each sample evaluated. In this case, the sharpness of each sample was expressed as a relative value when the sharpness of Sample No. 3 was set to 1.00.

The evaluation results of each sample are shown in Table 2.

TABLE 2

| Sample No. | Presence of light absorbing layer | Content of carbon black (mass parts) | Spectral reflectance (550 nm) | Sharpness (Relative value) | Remarks |
|---|---|---|---|---|---|
| 1 | No | 0 | 94 | 0.84 | Comparative |
| 2 | Yes | 4 | 75 | 0.96 | Inventive |
| 3 | Yes | 8 | 60 | 1.00 | Inventive |
| 4 | Yes | 12 | 45 | 1.14 | Inventive |
| 5 | Yes | 16 | 30 | 1.16 | Inventive |
| 6 | Yes | 20 | 15 | 1.21 | Inventive |

The result of Table 1 shows that the samples of the present invention exhibit superior properties.

What is claimed is:

1. A scintillator plate comprising:
   (i) a radiation transmissive substrate;
   (ii) a light absorbing layer formed on the substrate, the light absorbing layer absorbing light of a prescribed wavelength range; and
   (iii) a scintillator layer formed on the light absorbing layer, the scintillator layer converting radiation to light having a wavelength absorbable to the light absorbing layer,
   wherein the light absorbing layer is between the radiation transmissive substrate and the scintillator layer, and the light absorbing layer covers the entire surface of the substrate facing toward the scintillator layer.

2. The scintillator plate of claim 1, wherein a spectral reflectance of the light absorbing layer in a wavelength range of 500 to 600 nm is 5% or more and less than 50%.

3. The scintillator plate of claim 1, wherein the scintillator layer comprises a phosphor comprising CsI, wherein the CsI has a columnar crystal structure.

4. The scintillator plate of claim 3, wherein the phosphor comprises Thallium as an activator.

5. The scintillator plate of claim 4, wherein a content of Thallium is 0.03 to 30 mol % based on total moles of the phosphor.

6. The scintillator plate of claim 1, wherein the substrate is an aluminum plate.

7. A method of manufacturing the scintillator plate of claim 6 comprising the steps:
   (i) applying a surface-roughening treatment on a surface of the aluminum plate;
   (ii) forming a light absorbing layer on the surface of the aluminum plate being applied with the surface-roughening treatment; and
   (iii) forming a scintillator layer on the light absorbing layer.

8. The method of claim 7, wherein the surface-roughening treatment is an alumite treatment.

9. The scintillator plate of claim 1, wherein the substrate is a resin film comprising polyimide, polyethyleneterephthalate, polyethylenenaphthalate or polycarbonate.

10. A radiation image sensor comprising a scintillator plate of claim 1 and a photodetector which faces a scintillator layer of the scintillator plate.

11. A method of manufacturing the scintillator plate of claim 1 comprising the steps of:
    (i) forming a light absorbing layer on the radiation transmissive substrate; and
    (ii) forming a scintillator layer on the light absorbing layer.

* * * * *